No. 771,478. PATENTED OCT. 4, 1904.
K. J. KUYK.
BELT SHIFTER.
APPLICATION FILED FEB. 4, 1903.
NO MODEL.
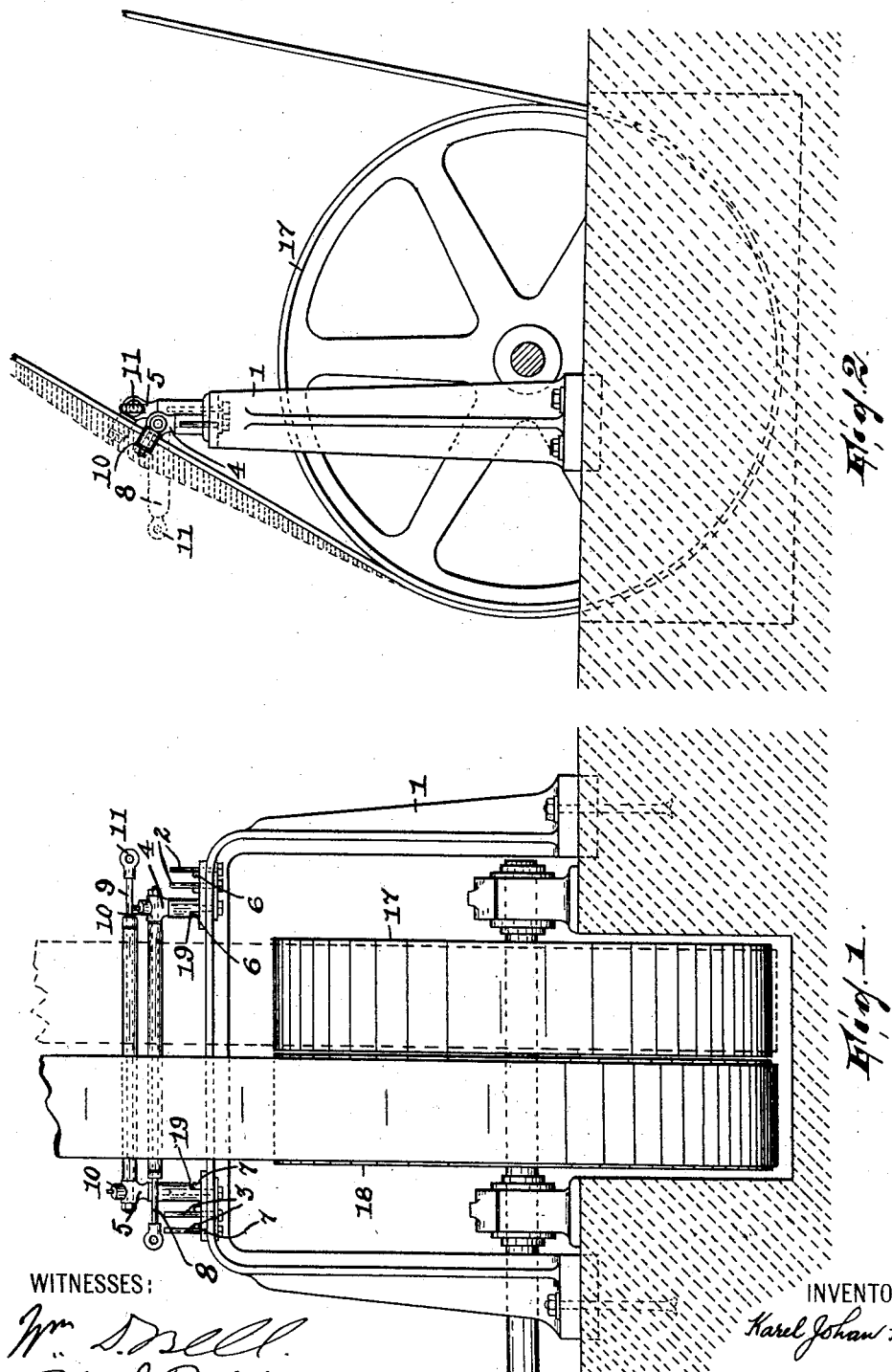
WITNESSES:
INVENTOR,
Karel Johan Kuyk,
BY
ATTORNEYS No. 771,478. Patented October 4, 1904.

UNITED STATES PATENT OFFICE.

KAREL JOHAN KUYK, OF MONT ST. AMAND, BELGIUM.

BELT-SHIFTER.

SPECIFICATION forming part of Letters Patent No. 771,478, dated October 4, 1904.

Application filed February 4, 1903. Serial No. 141,873. (No model.)

*To all whom it may concern:*

Be it known that I, KAREL JOHAN KUYK, manufacturer, a subject of the King of Belgium, residing at Mont St. Amand, Belgium, have invented new and useful Improvements in Belt-Shifters; and I do hereby declare the following to be a full, clear, and exact description of the same.

The shifting of a belt from the fixed pulley to the loose pulley, and vice versa, is usually effected by a fork between the arms or prongs of which the belt is engaged, so that upon the displacement of the fork to the right or to the left the fork will move the belt from the fixed to the loose pulley, or vice versa.

The present invention has for its object to provide a simple and easily-operated device for use as a belt-shifter, the same being so constructed as to induce the minimum of wear and tear on the belt, insure the accurate shifting of the belt from the one pulley to the other and avoid shifting the belt so far as to either throw it entirely off the pulleys or otherwise misplace the same.

The invention is illustrated in the accompanying drawings, in which—

Figure 1 is a front view of a first form of construction. Fig. 2 is a side view of the same.

Two arms 8 and 9 are mounted upon a frame 1, extending, preferably, above the pulleys. These arms turn, respectively, upon one of the pivots 2 or 3, one on either side of the band and pulleys, in such a manner as to extend across under the belt. One of the arms, 9, is situated slightly above the other arm, 8, so as to allow their free independent operation. Upon operating the upper arm 9—for instance, by its handle 11 or free end—and moving it against the belt upon the loose pulley 17 it causes the belt to glide on the arm 9 toward the pivot 3 of the latter and onto the fixed pulley 18. Instead of only one pivot for each arm on each side a number of pivots can be provided, and according to whether the arms are arranged upon one or other of these pivots, more or less remote from the pulleys, the action upon the belt will accordingly be combined with a more or less sensible tension of the belt. Upon the arms 8 and 9 are arranged, either above the pivots, as shown in the drawings, or above the handles 11, or finally above both these parts, stops 10, in order to prevent an excessive displacement of the belt. In order to minimize wear of the belt against the stops 10, the latter can be provided with jackets or rollers, which will freely revolve. The arms 8 and 9 can also be provided with sleeves or rollers for a similar purpose. These arms 8 and 9 are mounted upon the pivot-pins 2 and 3 by means of sleeves, or pins 4 and 5 on the arms may engage holes in the frame. In order to prevent an accidental movement which would shift the belt beyond the pulley, notches or recesses 19 are arranged in the sleeves 4 and 5 and corresponding catches or projections 6 and 7 on the frame, thereby limiting the motion of the arms 8 and 9. This arresting device can be so arranged that the shifting can be no longer effected when the belt becomes too loose, whereby the operator's attention is drawn to the necessity of shortening the belt. Moreover, between the two pulleys a suitable device (not shown in the drawings) can be arranged with the object of preventing accidental slipping of the belt from one pulley to the other, this device being put aside when one of the arms 8 or 9 is removed.

The operation of the arms 8 or 9 for shifting the belt is effected either by hand or by mechanical means of any suitable kind, arranged according to the construction of the mechanism or according to the place occupied by the operator in charge of the device or according to the force or power required for this operation.

The shifting arms can consist of any material, provided the latter is of sufficient strength. They should be smooth and preferably inclosed in sleeve-like casings 15, capable of rotating about their axes. It will be understood that the easier such casings or rollers rotate the greater are the advantages of the system.

In the examples above described it is supposed that the shifting arms are moved in a horizontal plane about vertical axes in such a manner as to be perpendicular to the rectilinear movement of the belt. However, it is preferable, when the space at disposal is large enough, to arrange these arms in a slanting direction to the rectilinear movement of the belt, the arms always extending parallel to the plane surface of the belt. Indeed, in consequence of the course of the belt the latter then moves more rapidly and more easily still from the fixed to the loose pulley, and vice versa.

I claim—

1. In a belt-shifter, the combination of a frame, the pulleys, the belt, and arms extending transversely of said belt and one being pivoted on one side and the other on the other side of said belt and in said frame, substantially as described.

2. In a belt-shifter, the combination of a frame, the pulleys, the belt, arms extending transversely of said belt and one being pivoted on one side and the other on the other side of said belt and in said frame, and means on said arms for preventing the displacement of the belt laterally off said arms, substantially as described.

In testimony whereof I have signed this specification in the presence of two subscribing witnesses.

KAREL JOHAN KUYK.

Witnesses:
  JOSEPH MARKL,
  GREGORY PHELAN.